(12) United States Patent
Karem

(10) Patent No.: US 7,858,012 B2
(45) Date of Patent: Dec. 28, 2010

(54) AUTOMATED PROTOTYPING OF A COMPOSITE AIRFRAME

(76) Inventor: Abe Karem, 1018 Timberline La., N. Tustin, CA (US) 92705

( * ) Notice: Subject to any disclaimer, the term of this patent is extended or adjusted under 35 U.S.C. 154(b) by 0 days.

(21) Appl. No.: 12/396,927

(22) Filed: Mar. 3, 2009

(65) Prior Publication Data

US 2009/0218723 A1 Sep. 3, 2009

Related U.S. Application Data

(60) Provisional application No. 61/033,319, filed on Mar. 3, 2008.

(51) Int. Cl.
*B29C 70/44* (2006.01)
(52) U.S. Cl. .................. 264/258; 264/240; 264/241; 264/247; 264/272.13; 264/259; 264/260
(58) Field of Classification Search ......... 264/258–260, 264/240, 241, 247, 272.13, 227, 221, 317
See application file for complete search history.

(56) References Cited

U.S. PATENT DOCUMENTS

| | | | | |
|---|---|---|---|---|
| 2,915,789 A * | 12/1959 | Dykstra et al. | ............ | 264/246 |
| 3,202,560 A * | 8/1965 | Michael | ............ | 156/155 |
| 3,574,040 A * | 4/1971 | Chitwood | ............ | 156/522 |
| 4,167,430 A | 9/1979 | Arachi | | |
| 4,518,288 A * | 5/1985 | Cilindro | ............ | 409/219 |
| 4,780,262 A | 10/1988 | Von Volkli | | |
| 4,815,383 A | 3/1989 | Ward et al. | | |
| 4,822,436 A | 4/1989 | Callis et al. | | |
| 4,859,528 A * | 8/1989 | Lee et al. | ............ | 442/180 |
| 4,863,663 A * | 9/1989 | Nico et al. | ............ | 264/130 |
| 5,152,856 A * | 10/1992 | Thein et al. | ............ | 156/79 |
| 5,292,475 A | 3/1994 | Mead et al. | | |
| 5,368,807 A * | 11/1994 | Lindsay | ............ | 264/510 |
| 6,012,883 A * | 1/2000 | Engwall et al. | ............ | 409/132 |
| 6,186,707 B1 | 2/2001 | Kain | | |
| 6,403,195 B1 * | 6/2002 | Montagna et al. | ............ | 428/71 |
| 2003/0146346 A1 | 8/2003 | Chapman | | |
| 2007/0029038 A1 | 2/2007 | Brown et al. | | |

* cited by examiner

*Primary Examiner*—Christina Johnson
*Assistant Examiner*—Stella Yi
(74) *Attorney, Agent, or Firm*—Fish & Associates, PC

(57) ABSTRACT

A high quality finished prototype fuselage structure of an aircraft is manufactured using a cured female tool and an automated composite layup machine, and then touched up by hand to meet a tolerance or other specification. The female tool is preferably made from a male mold, by depositing layers of composite material over the mold, curing the tool together at a first cure temperature, separating the tool from the mold, and then curing the tool at a second, higher temperature. The first cure temperature should be at or below an upper limit temperature no greater than 180° F. The second cure temperature is preferably in the range of 250° F. to 350° F. The step of hand touching up can comprise one or more of mechanically abrading and deforming a first portion of the fuselage structure to mate with a second portion of the fuselage structure.

14 Claims, 3 Drawing Sheets

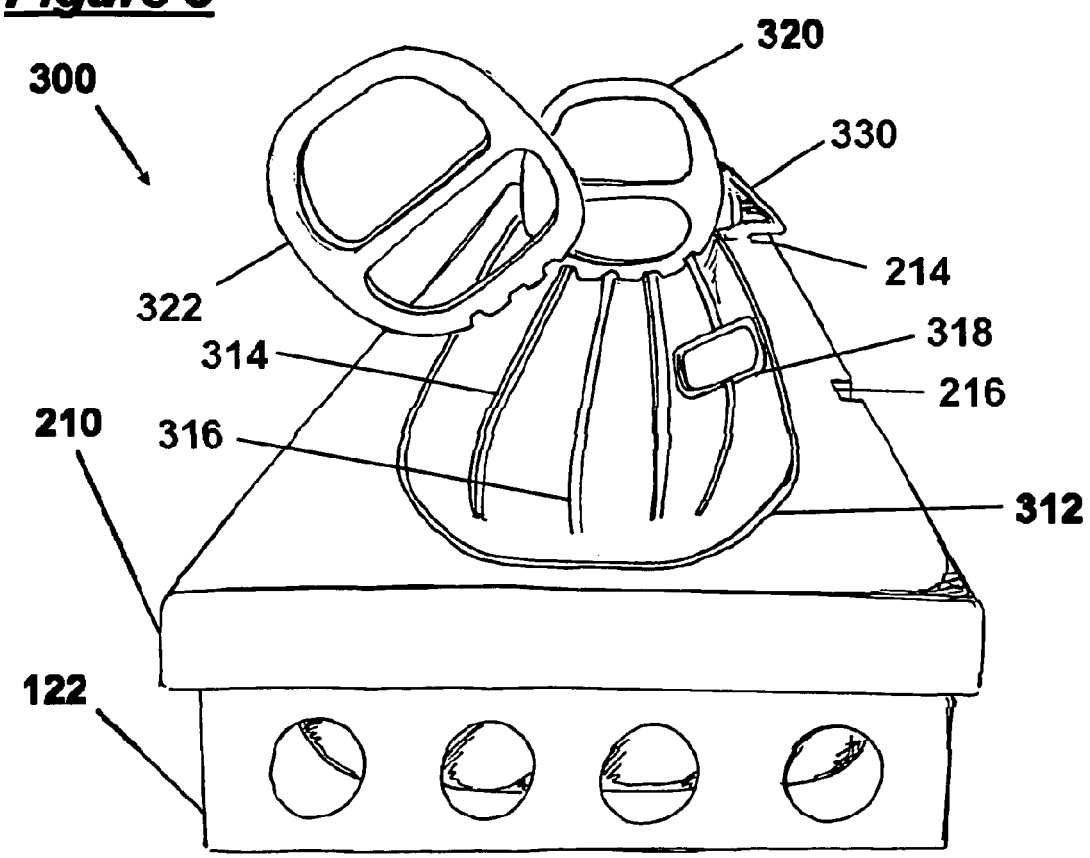

AUTOMATED PROTOTYPING OF A COMPOSITE AIRFRAME

This application claims priority to U.S. Provisional Application Ser. No. 61/033,319 filed Mar. 3, 2008 which is incorporated by reference herein in its entirety.

FIELD OF THE INVENTION

The field of the invention is composite structures for aircraft.

BACKGROUND

The advantages of using composites comprising carbon fiber reinforced epoxy or other thermosetting or thermoplastic resin in advanced structures, especially for aircraft, are well known in the industry. In recent years, carbon composite materials have begun to find wide acceptance in aircraft structures. With this new material have come new manufacturing, maintenance, and life cycle management processes as well as machines and analysis methods to manufacture and understand these materials.

The manufacture of composite structures in production quantities has been accomplished in part through the migration towards automated manufacturing methods. Automated tape laying and fiber placement machines make high quality, affordable parts for the Boeing™ 787 airframe. Furthermore, the use of such automated machines along with high quality steel tooling as practiced in the prior art results in high dimensional tolerance and eliminates the need for hand touch-up of the finished fuselage. Fiber placement machines are also used in the production of the fuselage of the Raytheon™ Premier. In developed nations this is preferred not only due to reduced manufacturing costs, but also due to the shortage of skilled aircraft quality manual composite technicians.

Further, autoclaves tend to be used in production programs. However, use of autoclaves in production of aircraft fuselage structures is expensive.

The prior art industry norm is to build aircraft directly to production standards when the aerodynamics, propulsion system, and dynamics are of an evolutionary nature, and the market for such aircraft is sufficiently well known. In such cases the industry or military customer can justify the large investment in production tooling, production process control, and detailed analyses, while being reasonably assured that no significant changes will be required during the aircraft ground and flight testing and certification or military qualification. In cases where substantial deviation from the known aerodynamic configurations, propulsion systems, or dynamics are attempted, or the market is not secure, low cost prototypes or research aircraft are built and flight tested before committing to a production program.

In the field of composite airframes, prior art prototype construction has not followed the same methods as production aircraft construction. Composite prototype fuselage structures tend to approximate the final airframe external shape quickly and inexpensively but do not conform to the processes or quality of typical production composite fuselage structures. By contrast, prior art aluminum prototype fuselage structures are typically made using similar processes as final production aluminum fuselage structures.

More recently, the industry has used automated machines for the manufacture of wing skins of expensive military prototypes and research aircraft. Such skins are relatively flat and mostly of single curvature, which shapes lend themselves well to manufacture using tape laying machines. Such composite skins have typically been assembled with metal internal supporting structure. No known prior art prototype uses the level of automation found, for example, in the composite airframe construction of the production Boeing™ 787 aircraft.

The substantial differences in weights, systems, and dynamics between prototype and production composite aircraft make a prototype essentially an aero-propulsion proof-of-concept. In most cases, the prototype fully conforms to the production shape, but is built with a different fuselage structure (for example that might include foam cores), whereas production aircraft would use stringers as layed up by automated machines.

Prototyping methods for composite fuselage structures have evolved to be completely different from production methods for very good reasons. First, prototyping tends to build a fuselage with manual labor, thereby reducing capital costs. Smaller pieces are favored due to limited reach of technicians, and the out-of-refrigeration time limit of many materials. Production methods on the other hand, tend to favor larger pieces, or even unitary construction, which can be cost-effectively built using automated composite lay-up machines. Second, prototyping has greater dimensional inaccuracy and large part-to-part variations, which is considered unacceptable when building production quantities, among other things because the parts are not sufficiently interchangeable. Automated machines have high dimensional accuracy, and produce interchangeable parts that require no fitting (or other hand touch up) during assembly. But the automated machines come at a high up front or capital cost that is not justified for many prototyping jobs.

In short, it is appreciated in the prior art that the use of labor in prototyping trades off against the higher cost of tooling and machinery in production, and that it makes little sense to have both high costs of labor and high costs of equipment. What is unappreciated in the prior art is that there are instances in which it may be cost-effective to make tooling with prototyping methods, but manufacturing the final fuselage structure using automated composite layup machines.

Therefore, there is a need for a schedule- and cost-affordable composite prototyping process which provides production quality or production conforming airframes.

SUMMARY OF THE INVENTION

The inventive subject matter provides apparatus, systems and methods in which a high quality finished prototype fuselage structure of an aircraft is manufactured using a cured female tool and an automated composite layup machine, and then touched up by hand to meet a tolerance or other specification.

Male molds can be made of any suitable material, including for example, epoxy foam and relatively soft plastics.

The female tool is preferably made from a male mold, by depositing layers of composite material over the mold, curing the tool together at a first cure temperature, separating the tool from the mold, and then curing the tool at a second, higher temperature. The female tool can comprise any suitable material, including for example, at least one of carbon-epoxy and fiberglass-epoxy. The female tool can be used in other ways, for example, as a fixture for drilling and/or for installing a fuselage bulkhead.

The first cure temperature should be at or below an upper limit temperature of the mold, which with currently preferred materials is likely to be no greater than 180° F. The second cure temperature is preferably in the range of 250° F. to 350° F. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

In other preferred aspects, the step of hand touching up can comprise one or more of mechanically abrading and deforming a first portion of the fuselage structure to mate with a second portion of the fuselage structure. Moreover, where additional (subsequent) fuselage structures are made using the female tool, the step of hand touching up can be substantially repeated on the additional structures. This would not be done with production methods, because in those instances the tool would be modified to correct any recognized defect, rather than touching up the final products.

In other aspects, it is contemplated that a company practicing the production of fuselages according to methods described herein receives advice that such methods are capable of reducing total program cost, time to market, and risk. Such advice could come from any entity, including for example a competitor, or a holder of a patent claiming such methods.

Various objects, features, aspects and advantages of the inventive subject matter will become more apparent from the following detailed description of preferred embodiments, along with the accompanying drawing figures in which like numerals represent like components. 1. A method of producing a fuselage structure of an aircraft, comprising:

BRIEF DESCRIPTION OF THE DRAWING

FIG. 3 illustrates a third step in the same preferred manufacturing process in which an airframe is assembled in the female tool.

DETAILED DESCRIPTION

Figure 1:
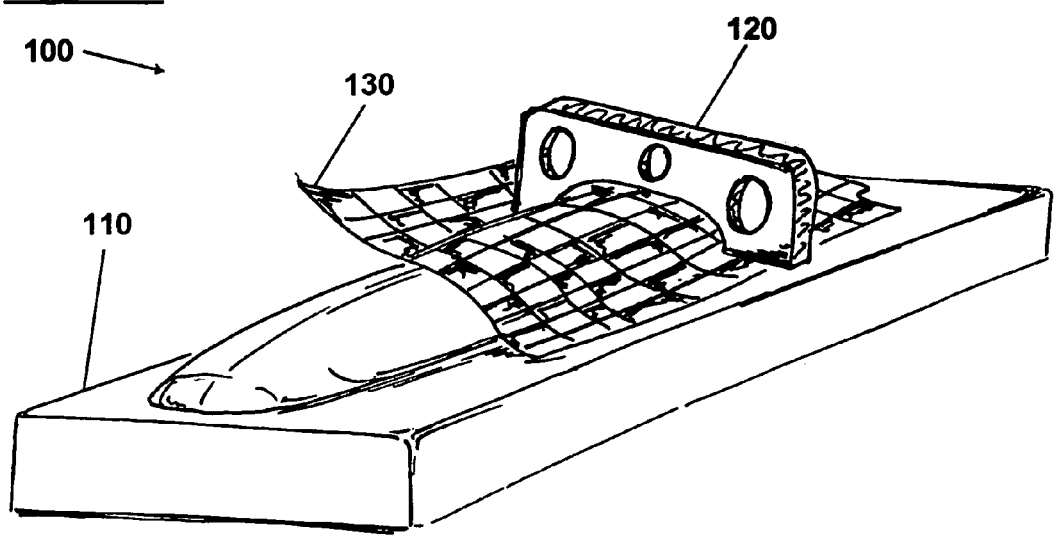
FIG. 1 depicts a first step in a preferred manufacturing process, using a male mold to create a female tool.

In the embodiments described below, a low-cost low-temp/high-temp tooling is combined with automated fiber placement and hand touch-up to produce production-conforming but rapid and low-cost airframe prototypes.

An exemplary preferred method begins with a computer aided design (CAD) model of the airframe or other product outer shape or outer mold line (OML). Through the use of direct CAD to computer aided manufacturing (CAM), the precision CNC master tools of the composite laminating tools would be designed and manufactured using low temperature limit plastic materials (solid or foam). Subsequently, high temperature (250-400 deg Fahrenheit) laminating and assembly tools can be manufactured from the low temp masters using carbon epoxy materials and low temp/high temp resins and tooling processes. It is envisioned that these resins allow the material to be pre-cured at a low temperature, while on the low cost master tool, and then later be post cured, without further support, at a high temperature suitable for use with the final product. It is contemplated that use of these cross-over resin systems dramatically reduces the cost of the master tool, allowing it to be a lower cost, low temperature capability material.

There are several potential advantages to following the teachings herein:

First, it is envisioned that preferred methods result in a substantial cost reduction in both raw material cost and tool creation labor. Fiber placement processes use less material for an equivalent part as compared to manual hand layup;

Second, it is contemplated that such methods would result in substantial tool weight reduction, arising partly from reduced tool thermal mass and shorter composite part curing cycle and higher manufacturing throughput;

Third, utilizing carbon-epoxy tooling eliminates coefficient of thermal expansion mismatch between the final part and the female tool, as both are preferably of carbon-epoxy construction; and Fourth, the use of both male molds and female tools provides for manufacturing of low cost assembly tools, and when production rates increase, duplicate laminating tools (rate tools in the industry vernacular).

A person skilled in the art will appreciate that despite the shorter lifespan of a lower weight, lower cost carbon epoxy tool relative to a machined steel tool, the epoxy tool is still capable of enduring some repetitive exposure to the local pressures of the automated tape laying and fiber placement machines, and the temperature and pressure cycles of curing ovens and autoclaves. Preferred methods therefore provide for low initial investment manufacturing of large contoured composite laminates of substantially the same quality and stress allowables of production composites as compared with prior art composite production methods. Preferred methods also provide lower labor costs and better traceability and repeatability as compared with prior art composite prototyping methods.

It is contemplated that the recent development of out-of-autoclave resin can make the present inventive material even more attractive. Such a resin system can deliver the material properties and void contents of traditional autoclave cured laminates, without the time and expense of the autoclave process. Thus, it is contemplated that carbon epoxy tools used in preferred methods would not need to withstand repetitive exposure to autoclave pressures, and are expected to have a relatively long life in production. As a result, a production ready prototype design could be achieved with a single design path at a low cost and rapid turnaround.

As previously discussed, autoclaves used for curing composite materials can represent a large portion of production cost. In prior art processes, the compaction that an autoclave applies is crucial in reducing void count in prior art processes, and in consolidating plies both for composite tools and the final composite laminate. A typical autoclave process can apply 100 pounds-per-square-inch (psi) compaction pressure as opposed to 15 psi for a vacuum process. Proper consolidation in an airframe or part laminate results in higher material properties and thus lower weight and higher performance in the final structure. Proper consolidation in a composite tool results in a higher quality surface and a more robust tool for longer life.

Recent improvements in out-of-autoclave resin chemistry and rheology have produced resin systems (such as ACG™ MTM-45) with viscosity versus temperature profiles that allow the resin to flow well before significant cross-linking occurs. This allows vacuum pressure alone to remove the majority of voids in the laminate to create a final product closer to autoclave cure quality.

It is contemplated that such a resin systems could be used for a low-cost prototype process that also seeks lower cost male tooling material on which to create the out-of-autoclave composite tools. These tooling materials are typically low to medium density foams or resin boards. These materials are envisioned to be readily machineable and bondable and typically lack high temperature performance in order to be compatible with typical high quality resins.

In thermosetting resin systems, the highest cure temperature is typically an indicator of final resin glass transition temperature. Higher curing temperatures also trend toward higher degrees of resin cross linking and thus mechanical properties. Typical high performance thermosets are cured at 350 degrees Fahrenheit.

Most economical tooling boards and foams are limited to operation up to 180 degrees Fahrenheit. Beyond such temperatures, the cost of the material increases rapidly, and may become prohibitive for prototyping processes.

Modern out-of-autoclave resins address both these challenges by allowing flexible curing cycles. It is contemplated that a female tool could be laminated on a male mold. A low-temp cure could then be performed at a primary cure temperature (120-180 degrees Fahrenheit) with the female tool (laminate) on the tool until significant (>50%) cross linking has occurred. The laminate can then be separated from the male mold and will retain its shape when returned to an oven for a high temp post cure at a secondary cure temperature of 350-450 degrees Fahrenheit. This process readily yields laminates with good compaction (void contents below 1%) and long service life at cycle temperatures below the post cure temperature.

Preferred processes would use low-temp, high-temp out-of-autoclave tooling resin in conjunction with a low-temp epoxy male mold to create a carbon laminate female tool. Such a tool could advantageously contain reference points and features that allow it to be used for trimming and drilling of the final part. In this manner, it is contemplated that the laminated part need not be transferred to another tool or jig for finishing, thus reducing process steps. This carbon laminate female tool would be post cured above the cycle temperature of the envisioned laminate part, enabling continued use at the production temperature of the final part. Unlike prior art low cost prototypes, part lamination would preferably be accomplished using an automated tape laying machine or automated fiber placement machine. Use of such a machine is contemplated to increase the laminate consistency and repeatability. The automated machines could also reduce labor costs and allow for closer pre-production estimates of manufacturing times and material scrap rates.

As used herein, an out-of-autoclave resin is defined by a viscosity versus temperature profile that shows significant, (greater than 30%) reduction in viscosity over the cure cycle temperatures. A specific feature of some preferred out-of-autoclave resins is a two-stage or multi-cycle process capability. This enables tailoring of material properties through two or more different cure cycles. As an example, a part could be cured at 180° F. for 14 hours to achieve full strength, or it could be cured for 3 hours at 250° F. It is contemplated that in many cases, a cure at 350° F. would allow the part to continue to be cycled at 250° F. In these cases the part can be cured partially at 180° F. for 4 hours; then it can be placed back in an oven for a free-standing post cure at a higher temperature of 350° F.

In some embodiments, a high stress allowable out-of autoclave curing composite material could be used in manufacture of the airframe. It is contemplated that a CNC machine could be used for trimming and drilling at least one part of the airframe. Such methods are capable of reducing total program cost, time to market, and risk.

FIG. 1 depicts a first step 100 in a preferred manufacturing process that uses a low-temp male mold 110 to create a high-temp female tool 210. A material is machined into a low-temp male mold 110. As used herein, the term "male mold" means a mold that corresponds in shape to a positive of the finished product. Thus, if an external surface of a male mold is convex, then the corresponding external surface of the finished product will be convex. As used herein, the term "female tool" means a production tool that corresponds in shape to a negative of the finished product. Thus, a cavity on the corresponding female tool will mate with a protuberance on a corresponding male mold and a protuberance on the finished part. The terms "male mold" and "female tool" are used herein in a sense that does not limit shape to male and female parts. For example, each of male molds and female tools can include both convexities and concavities, and protuberances and cavities.

Preferred methods of manufacturing the male mold comprise designing, manufacturing, and utilizing low-cost high-precision master tools with a low upper limit temperature (120-180 degree Fahrenheit). High precision is preferably achieved using computer numerically controlled or CNC machining to mill or otherwise shape a master tool. Low cost is preferably achieved by the selection of materials having a relatively low upper limit temperature, which are usually less expensive than materials having a relatively high upper limit temperature.

All suitable materials are contemplated for the male mold 110 including epoxy board, high density foam, or other material. As used herein, a low-temp mold is one that loses its geometric configuration above an "upper limit temperature" of 120, 140, 160, or 180 degrees Fahrenheit. A low-temp mold will thermally expand in accordance with its coefficient of thermal expansion (CTE) at temperatures lower than its upper limit temperature, but will generally maintain its geometric configuration, and not melt, burn, disintegrate or otherwise permanently deform.

Low temp tooling materials are typically classified in the 120-180° F. cure range. Beyond this temperature capability, epoxy tooling boards or polyurethane foams show a large (>20%) increase in price. Regardless of temperature capability, foams and epoxies have similar co-efficients of thermal expansion, 22.0e–6 in/in-° F. Whereas typical high cost Invar™ has a CTE of 0.3e–6 in/in-° F. Thus curing parts on epoxy tools at temperatures above 180° F. also has the drawback of incurring large thermal deformations in the tool. Although these can be compensated for in analysis, a large thermal delta on a large master tool will create a thermal lag in the material such that a steady state temperature cannot easily be achieved before significant cross-linking occurs in the laminate.

To make a female tool, a plurality of layers of composite material 130 is layed up on the low-temp male mold 110. All suitable composite materials are contemplated, but especially preferred composite materials include carbon fiber fabric weaves pre-impregnated with an epoxy resin. The resulting laminate comprising a plurality of layers of composite material 130 is cured in a low-temperature process at a primary cure temperature of for example 120, 140, 160, or 175 degrees Fahrenheit, with the laminate on the tool 110 for a low-temp curing time until more than 20%, 30%, or even 40% cross linking has occurred.

Once the low-temperature curing has taken place, a supporting member 120 is bonded with the cured laminate comprising a plurality of layers of composite material 130 to provide supporting structure for the resulting female tool 210.

The resulting female tool 210 is preferably subjected to a free-standing high-temp post-cure process. The term "free-standing" is used herein to mean that the female tool is no longer supported by the male mold 110, and is capable of maintaining a geometric configuration without external support. As used herein, a "high-temp post-cure process" is a process that exposes a part or assemblage of parts to temperatures in the range of 300° F., 350° F., or even 400° F. depending on the resin system used.

Figure 2:
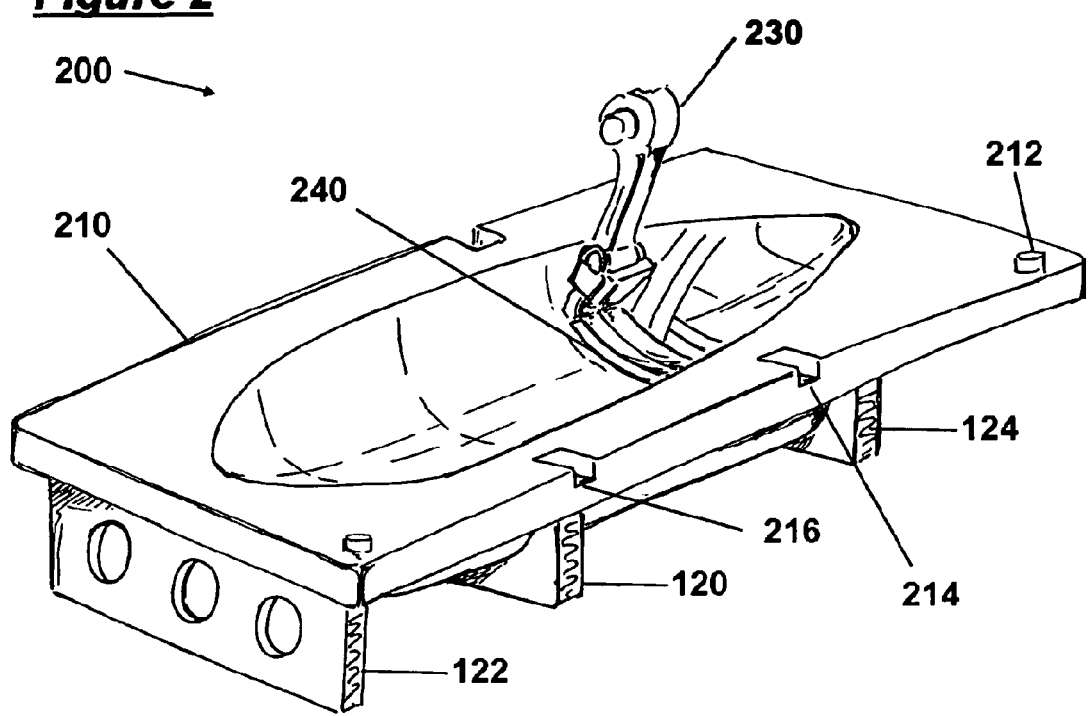
FIG. 2 depicts a second step in the process of FIG. 1 in which an automated layup machine is used to deposit composite material.

FIG. 2 depicts a second step 200 in a preferred manufacturing process in which an automated layup machine 230 is used to deposit or lay down composite material 240. All suitable automated layup machines 230 are contemplated, but automated fiber placement machines and automated tape laying machines are especially preferred. Similarly, all suitable composite materials 240 are contemplated, but especially preferred composite materials are those comprising graphite or carbon.

A preferred female tool 210 has a tooling indicator 212, and a first and second assembly fixtures 214, 216. Further, the tool 210 is supported by supporting members 120, 122, 124. The tooling indicator 212 and assembly fixture 214 enable the tool 210 to be used for trimming, drilling, and assembly.

FIG. 3 illustrates a third step 300 in the same preferred manufacturing process in which an airframe is assembled in the female tool 210. An automated layup machine 230 advantageously deposits composite material 240 to create a skin laminate 312. It is contemplated that stringers 314, 316, and cutout reinforcements 318 may also be created by said automated layup machine 230, or bonded to the skin laminate 312 in a manual process.

A first fuselage frame 320 supported by a frame support 330 installed in assembly fixture 214. A second fuselage frame 322 could be subsequently installed. Fuselage frames are preferably attached to the skin laminate 312 by bonding or using fasteners.

In preferred methods, an assembled airframe is subjected to a final curing process in one or more female tools 210. In alternate methods, the skin laminate 312 and stringers 314, 316 may be co-cured in the female tool 210 before bonding fuselage frames 320, 322 in place. Preferred final curing processes comprise vacuum or autoclave pressures, and curing temperatures of 250° F. or 350° F.

It is envisioned that once curing and assembly steps have been completed using the female tool 210, the airframe is removed. Hand touching up of the fuselage or fuselage components may be required to achieve specified dimensional or other tolerances. The term "hand touching up" means that the modifications needed as a result of variability introduced by use of a somewhat soft female tool prone to a greater degree of thermal expansion than a steel tool, need human judgment to make the modification, and that such modifications can vary significantly from one fuselage to another. Contemplated modifications may include, for example, one or more of sanding or otherwise mechanically abrading, clamping, deforming, heating, or otherwise fitting one part to another.

Thus, specific embodiments and applications of automated prototyping of a composite airframe have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of producing a fuselage structure of an aircraft, comprising in sequence:
    manufacturing a male mold from an epoxy foam material that permanently deforms at or below an upper limit temperature that is no greater than 180° F., using computer numerically controlled machining;
    adding a plurality of composite layers to the male mold to create a female tool;
    at least partially curing the female tool at a primary cure temperature below the upper limit temperature, while at least a portion of the female tool is coupled to at least a portion of the male mold;
    separating at least the portion of the female tool from the portion of the male mold;
    curing the female tool at a secondary cure temperature above the upper limit temperature;
    using an automated composite layup machine to deposit composite material on the female tool, in a freestanding fashion, to create the fuselage structure; and
    hand touching up the fuselage structure to meet a specification.

2. The method of claim 1, wherein the upper limit temperature that is no greater than 160° F.

3. The method of claim 1, wherein the primary cure temperature is 140° F.

4. The method of claim 1, wherein the secondary cure temperature is 250° F.

5. The method of claim 1, wherein the secondary cure temperature is 350° F.

6. The method of claim 1, wherein the automated composite layup machine comprises a fiber placement machine.

7. The method of claim 1, wherein the step of hand touching up comprises mechanically abrading.

8. The method of claim 1, wherein the step of hand touching up further comprises a step of deforming a first portion of the fuselage structure to mate with a second portion of the fuselage structure.

9. The method of claim 1, wherein the step of hand touching up is repeated on subsequent fuselage structures made using the female tool.

10. The method of claim 1, wherein the female tool comprises at least one of carbon-epoxy and fiberglass-epoxy.

11. The method of claim 1, further comprises a step of using the female tool as a fixture for drilling.

12. The method of claim 1, further comprises a step of using the female tool as a fixture for installing a fuselage bulkhead.

13. The method of claim 1, wherein the specification comprises a desired dimensional tolerance.

14. The method of claim 1, further comprising a step of reusing the male mold to create a second female tool.

* * * * *